United States Patent
Ohno et al.

(10) Patent No.: US 11,567,176 B2
(45) Date of Patent: Jan. 31, 2023

(54) OPTICAL DEFLECTION ELEMENT, BEAM STEERING APPARATUS AND MOVING BODY

(71) Applicant: Kabushiki Kaisha Toshiba, Minato-ku (JP)

(72) Inventors: Hiroshi Ohno, Tokyo (JP); Yongfang Li, Kawasaki (JP); Hideaki Okano, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 737 days.

(21) Appl. No.: 16/556,578

(22) Filed: Aug. 30, 2019

(65) Prior Publication Data

US 2020/0300981 A1 Sep. 24, 2020

(30) Foreign Application Priority Data

Mar. 18, 2019 (JP) .............................. JP2019-049632

(51) Int. Cl.
*G01S 17/89* (2020.01)
*G01S 7/481* (2006.01)
*G02F 1/33* (2006.01)
*G01S 17/10* (2020.01)

(52) U.S. Cl.
CPC ............ *G01S 7/4817* (2013.01); *G01S 17/10* (2013.01); *G02F 1/33* (2013.01); *G01S 17/89* (2013.01); *G02F 2203/24* (2013.01)

(58) Field of Classification Search
CPC ........ G01S 7/4817; G01S 17/10; G01S 17/89; G02F 1/33
USPC ....................................................... 356/5.01
See application file for complete search history.

(56) References Cited

U.S. PATENT DOCUMENTS

2017/0356796 A1  12/2017  Nishio

OTHER PUBLICATIONS

Poulton, C. et al. "Coherent solid-state LIDAR with silicon photonic optical phased arrays", Optics Letters, vol. 42, No. 20, Oct. 15, 2017, pp. 4091-4094.

*Primary Examiner* — Nguyen T Truong
(74) *Attorney, Agent, or Firm* — Oblon, McClelland, Maier & Neustadt, L.L.P.

(57) ABSTRACT

According to one embodiment, an optical deflection element includes a substrate and three or more electrodes. The substrate has an incidence plane which the laser light enters and an emission plane from which the laser light exits. The three or more electrodes are arranged on the substrate at first intervals in a first direction. Electrodes allow a surface acoustic wave having a first wavelength to be generated in the substrate by applying a voltage thereto. Wiring is provided such that a voltage is selectively applied to the electrodes at an interval between at least two electrodes. The electrodes allow a surface acoustic wave having a second wavelength to be generated in the substrate by applying a voltage selectively at second intervals.

18 Claims, 10 Drawing Sheets

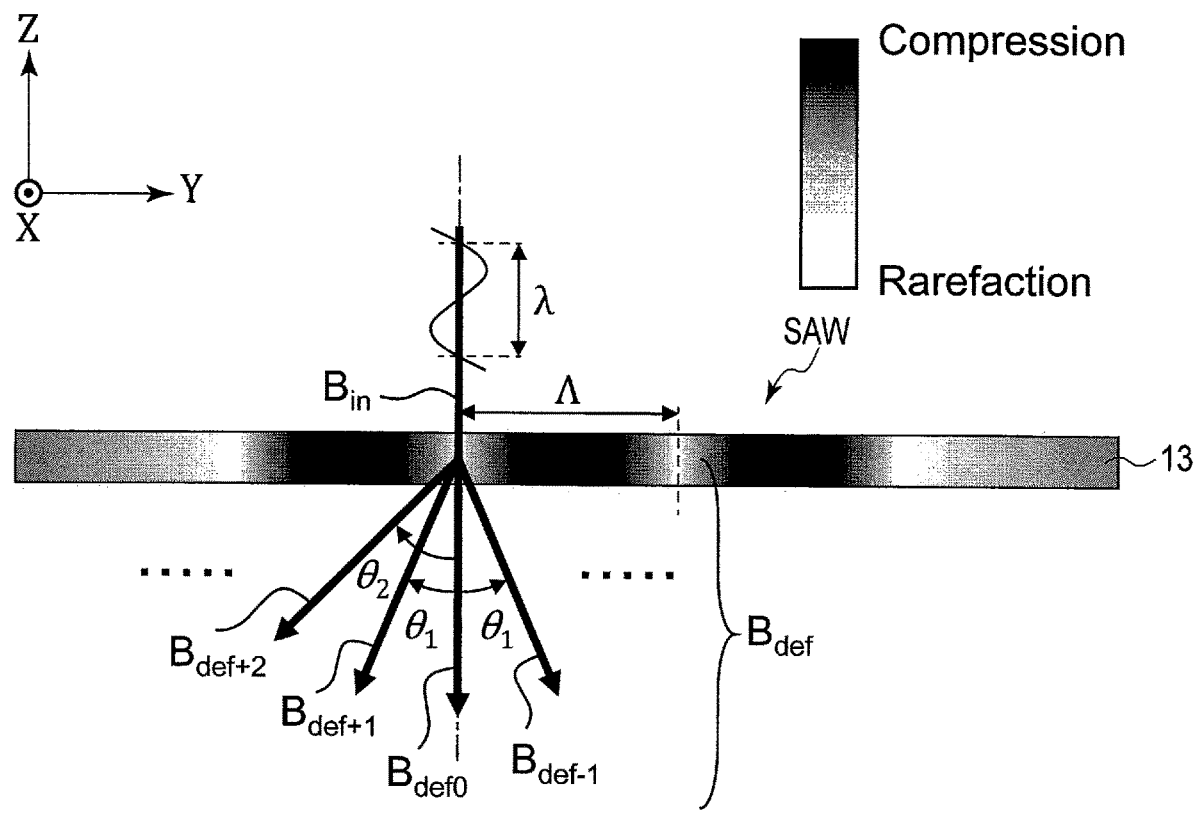
F I G. 5

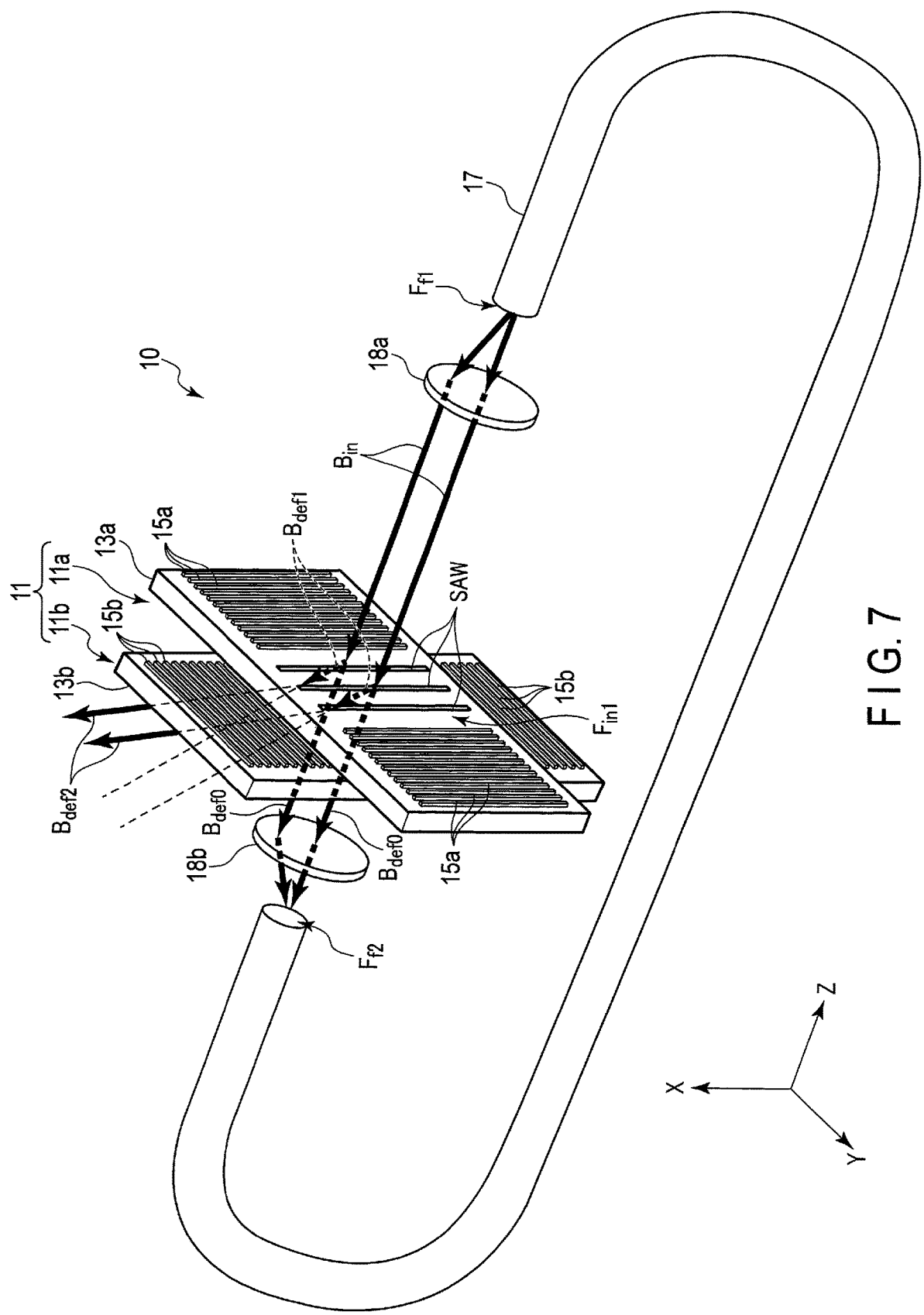
F I G. 7

OPTICAL DEFLECTION ELEMENT, BEAM STEERING APPARATUS AND MOVING BODY

CROSS-REFERENCE TO RELATED APPLICATION

This application is based upon and claims the benefit of priority from Japanese Patent Application No. 2019-049632, filed Mar. 18, 2019, the entire contents of which are incorporated herein by reference.

FIELD

Embodiments described herein relate generally to an optical deflection element, a beam steering apparatus and a moving body.

BACKGROUND

There are mechanical devices such as a galvanomirror as a device used to change the direction of light propagation, that is, to deflect light. However, the mechanical devices have a problem of being sensitive to mechanical vibrations. They also have a problem that the deflection speed is not sufficient depending on their uses.

BRIEF DESCRIPTION OF THE DRAWINGS

FIG. 5 is a diagram explaining the deflection of light by the optical deflection element of FIG. 3.

FIG. 7 is a perspective view showing an example of the configuration of an optical system according to a third embodiment.

DETAILED DESCRIPTION

Figure 1:
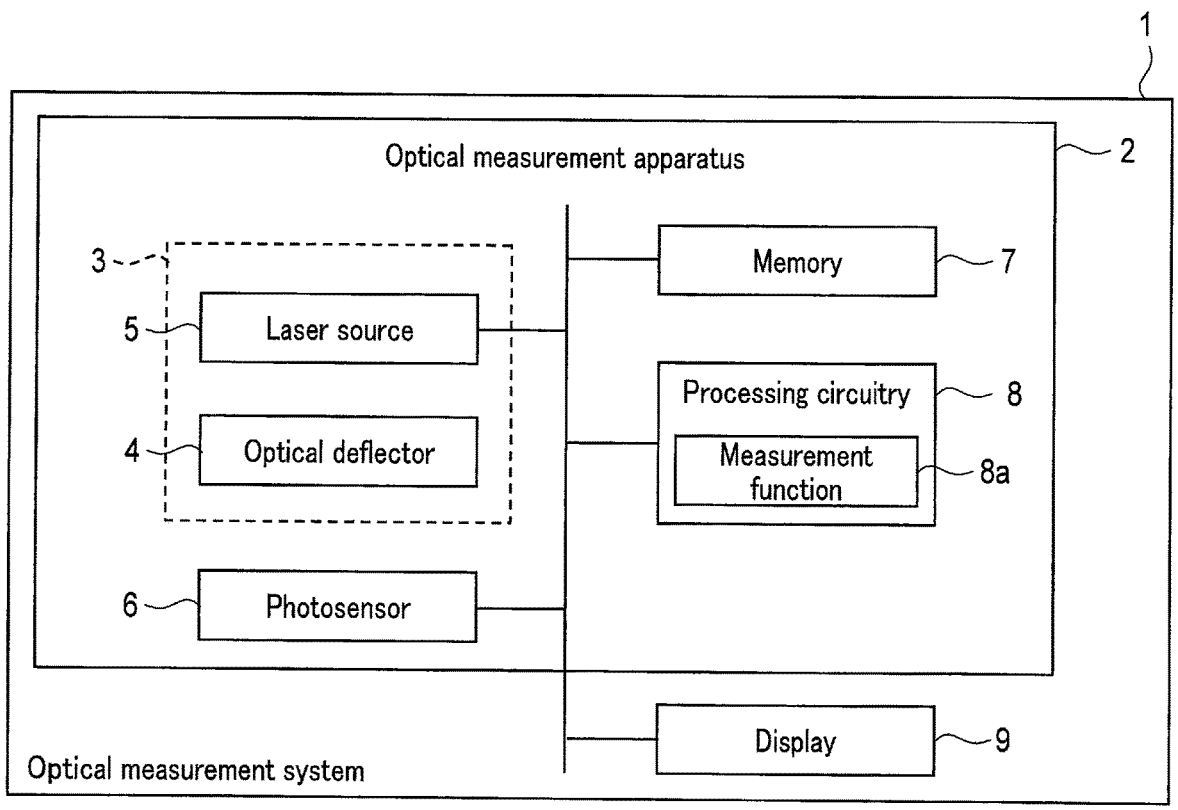
FIG. 1 is a block diagram showing an example of the configuration of an optical measurement system according to an embodiment.

According to one embodiment, an optical deflection element includes a substrate and three or more electrodes. The substrate is transparent to laser light. The substrate has an incidence plane which the laser light enters and an emission plane from which the laser light, which has entered the incidence plane and transmitted through the substrate, exits. Three or more electrodes arranged on the substrate at first intervals in a first direction. The electrodes allow a surface acoustic wave having a first wavelength to be generated in the substrate by applying a voltage thereto. Wiring is provided such that a voltage is selectively applied to the electrodes at an interval between at least two electrodes. The electrodes allow a surface acoustic wave having a second wavelength other than the first wavelength to be generated in the substrate by applying a voltage selectively at electrode intervals other than the first intervals.

Various Embodiments will be described hereinafter with reference to the accompanying drawings. Each drawing is schematic or conceptual and the relationship between the thickness and the width of each part and the size ratio between the respective parts are not necessarily the same as actual ones. In addition, even when the same portions are shown, the portions are sometimes shown in different dimensions and ratios depending on the drawings. Note that in this specification and the respective drawings, the same reference numerals denote the same components described with reference to the drawings already referred to. A detailed description of such components will be omitted as appropriate.

The description of light in each of the following embodiments is not limited to visible light. Light has only to be any electromagnetic wave that can be described by the Maxwell's equations. That is, light can be described by the Maxwell's equations and is considered to be a type of electromagnetic wave. It should be noted that the term "light" in the following description represents, for example, light having a wavelength in the visible region or the near infrared region to the far infrared region. Specifically, the wavelength of light according to each of the following embodiments is, for example, 1 µm.

First, an example of the configuration of an optical measurement system 1 according to an embodiment will be described in detail with reference to the drawings. FIG. 1 is a block diagram showing the example.

As shown in FIG. 1, the optical measurement system 1 includes an optical measurement apparatus 2 and a display 9. The optical measurement apparatus 2 includes an optical deflector 4, a laser source 5, a photosensor 6, a memory 7 and processing circuitry 8. As shown in FIG. 1, the laser source 5, photosensor 6, memory 7, processing circuitry 8 and display 9 are communicably connected to each other via a bus, a network and the like.

In this embodiment, the optical measurement apparatus 2, which is configured as light detection and ranging (LiDAR), will be described as an example. The LiDAR is an apparatus which irradiates pulsed laser light to a measurement target and receives the light reflected from the measurement target to localize the measurement target. That is, the optical measurement apparatus 2 can acquire the direction of the measurement target, the distance to the measurement target, the density of the measurement target, etc. as information about the measurement target.

The optical deflector 4 is configured and/or disposed so as to receive laser light from the laser source 5. The optical deflector 4 is configured to deflect the received laser light at a predetermined angle. The laser light deflected by the optical deflector 4 is applied to the measurement target. The optical deflector 4 will be described in detail later.

The laser source 5 generates pulsed laser light having a predetermined wavelength. The laser source 5 generates laser light (laser light of infrared rays) having a wavelength of about 1 μm (e.g. 950 nm, 1064 nm, 1550 nm). The laser source 5 is so configured and/or disposed that the generated laser light enters the optical deflector 4. As the laser source 5, for example, a semiconductor laser and a solid-state laser are used, but other lasers such as a liquid laser and a gas laser may be used.

The photosensor 6 receives (senses) the laser light which is applied to the measurement target from the laser source 5 through the light deflector 4 and then reflected by the measurement target. The photosensor 6 outputs a temporal change in the intensity of the received laser light as a light-receiving signal. The output light-receiving signal is supplied to the processing circuitry 8. As the photosensor 6, for example, a light-receiving element such as a photodiode (PD), an avalanche photodiode (APD), a PIN-PD, a multi-pixel photon counter (MPPC), and silicon photomultiplier (SiPM) is selected as appropriate according to the laser source 5.

The memory 7 stores the outputs of the photosensor 6 and the processing circuitry 8. It is assumed that the memory 7 stores in advance the wavelength of the laser light generated by the laser source 5, various programs to be executed by the processing circuitry 8, and the like. Also, the memory 7 temporarily stores various types of data being processed. The memory 7 is a nonvolatile memory such as a flash memory, but may be a hard disk drive (HDD), a solid-state drive (SSD) and a storage device such as an integrated circuit storage device or may further include a volatile memory.

The processing circuitry 8 is, for example, an integrated circuit such as a central processing unit (CPU) and an application specific integrated circuit (ASIC). A general-purpose computer may be used as the processing circuitry 8. The processing circuit 8 is not limited to fulfilling various functions by various programs developed in the memory, but may be provided as a dedicated circuit. The programs may be stored in a storage area in the integrated circuit. The processing circuitry 8 performs a measurement function 8a.

In the measurement function 8a, the processing circuitry 8 controls the operation of the laser source 5 to generate laser light. In response to the light-receiving signal from the photosensor 6, the processing circuitry 8 measures time elapsed from when the measurement target is irradiated with laser light until the photosensor 6 receives the reflected light from the measurement target. The processing circuitry 8 calculates a distance to the measurement target (information about the measurement target) based upon the measured elapsed time. The processing circuitry 8 calculates, for example, the azimuth of the measurement target (information about the measurement target) based upon the information about the setting of the optical deflector 4 and the light-receiving signal from the photosensor 6. The information about the setting of the optical deflector 4 may be stored in advance in the memory 7 or the like. Alternatively, if the optical measurement apparatus 2 includes an input device such as a keyboard and a mouse, the information may be input by a user using the input device. The information may also be acquired by communication from the optical deflector 4. In addition, the processing circuitry 8 generates image data for display to display the calculated measurement target information. The processing circuitry 8 for fulfilling the measurement function 8a is an example of the measurement control unit according to the claims.

The processing circuit 8 may be located outside the optical measurement apparatus 2. In this case, the output of the photosensor 6 may be output to the outside of the optical measurement apparatus 2 or recorded in the memory 7. That is, the information about the measurement target may be calculated inside or outside the optical measurement apparatus 2.

The display 9 displays an image based upon image data for display generated by the processing circuitry 8 and an image for an operation screen. The display 9 is, for example, a liquid crystal display and an organic EL display.

The display 9 need not be provided and, in this case, the output of the processing circuitry 8 has only to be stored in the memory 7 or displayed on a display provided outside the optical measurement system 1 or recorded in a memory provided outside the optical measurement system 1.

Figure 2:
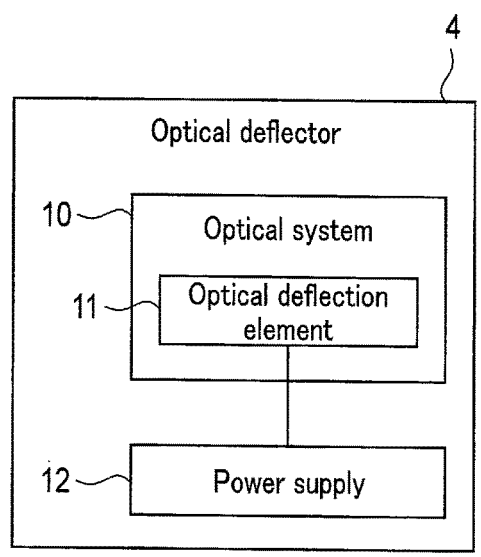
FIG. 2 is a block diagram showing an example of the configuration of an optical deflector of the system of FIG. 1.
Figure 3:
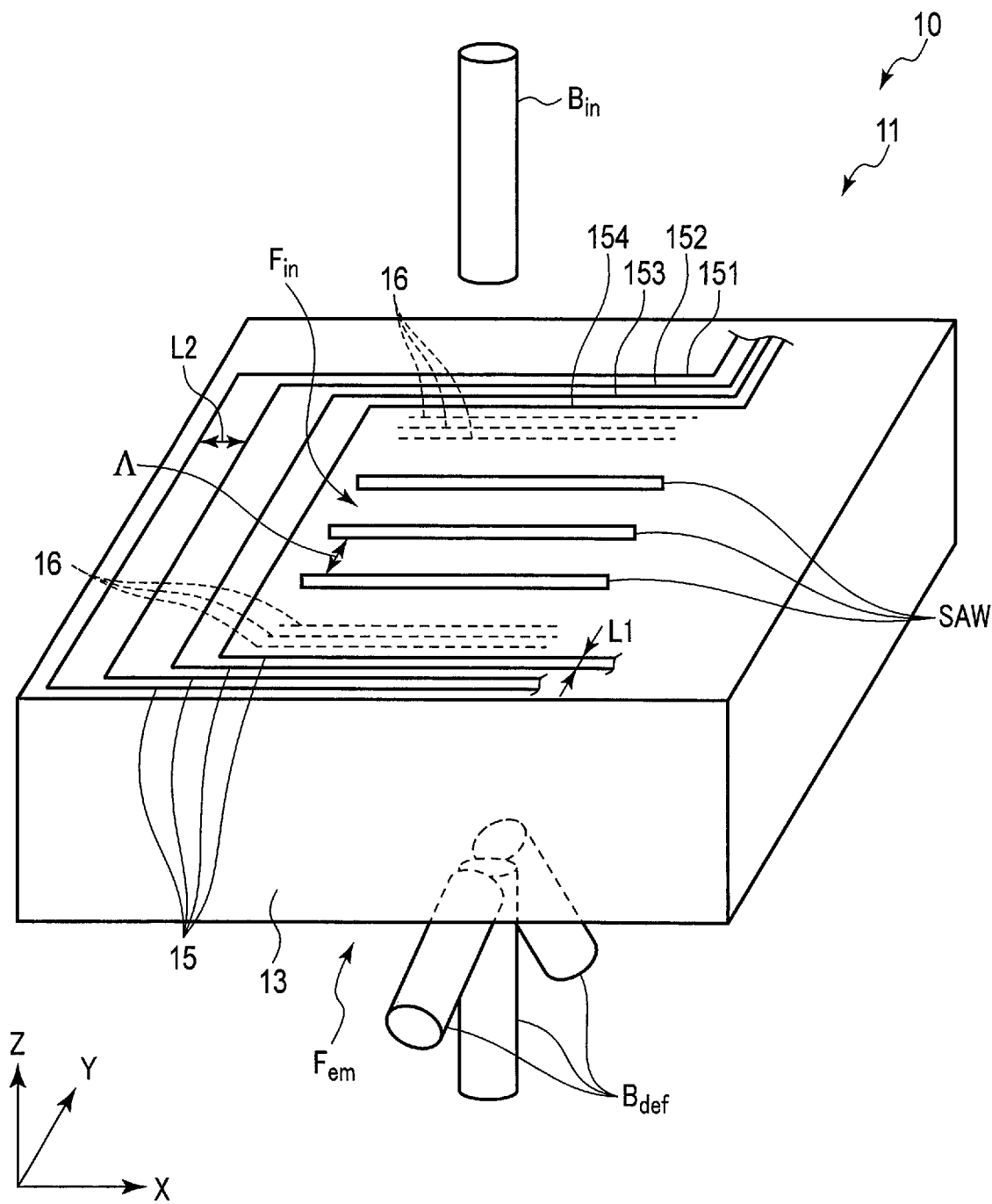
FIG. 3 is a perspective view showing an example of the configuration of an optical deflection element of the optical deflector of FIG. 2.

The optical deflector 4 according to the present embodiment will now be described in more detail with reference to the drawings. FIG. 2 is a block diagram showing an example of the configuration of the optical deflector 4 shown in FIG. 1. FIG. 3 is a perspective view showing an example of the configuration of an optical deflection element 11 shown in FIG. 2.

As shown in FIG. 2, the optical deflector 4 includes an optical system 10 and a power supply 12. The optical system 10 includes the optical deflection element 11.

For simplicity of description, it is assumed that a substrate 13 of the optical deflection element 11 is formed like a flat plate and its sides are parallel to X, Y and Z axes. Among the surfaces of the substrate 13 that are parallel to the X-Y plane, the +Z-side surface and the −Z-side surface will be referred to as a front surface and a back surface, respectively. It is also assumed that the laser light enters the surface of the substrate 13 in a direction (Z direction) normal to the surface of the substrate 13.

The substrate 13 of the optical deflection element 11 is transparent to the laser light. As the substrate 13, for example, a lithium niobate ($LiNbO_3$) substrate is used. The thickness of the substrate 13 is, for example, substantially the same as the wavelength of a surface acoustic wave (SAW) which will be described later, but may be greater or less than the wavelength.

Note that a substrate other than the $LiNbO_3$ substrate that is transparent to the laser light, such as an optical glass substrate, may be used as the substrate 13.

As shown in FIG. 3, the front surface and the back surface of the substrate 13 have an incidence plane $F_{in}$ and an emission plane $F_{em}$, respectively. The incident plane $F_{in}$ is, for example, the center of the surface of the substrate 13 and an area close thereto. The emission plane $F_{em}$ is part or all of the surface (back surface) opposite to the surface (front surface) with the incidence plane $F_{in}$.

As shown in FIG. 3, a plurality of electrodes 15 are arranged on the surface of the substrate 13. The electrodes 15 are linear electrodes. In the example shown in FIG. 3, a first electrode 151, a second electrode 152, a third electrode 153 and a fourth electrode 154 are shown as the electrodes 15, and the number of arrays of the electrodes 15 may be plurality of 2, 3, 5 or more.

As shown in FIG. 3, the electrodes 15 are arranged in the Y direction so as to surround the incidence plane $F_{in}$. In other words, the incidence plane $F_{in}$ is located on the surface of the optical deflection element 11 and inside the electrodes 15. Specifically, the electrodes 15 are arranged in the Y direction (first direction) at regular first intervals of $L_1$. The electrodes 15 arranged in the first direction are each bent in an L shape and are arranged in the X direction (second direction) at second intervals of $L_2$. The first and second directions are orthogonal to each other. The electrodes 15 arranged in the second direction are each further bent in an L shape and are arranged again in the first direction at regular first intervals of $L_1$. That is, the electrodes 15 arranged in the first direction are arranged symmetrically with respect to the incidence plane $F_{in}$ on the surface of the optical deflection element 11. The first interval $L_1$ between the electrodes 151 to 154 is constant in the first direction. On the other hand, the second interval $L_2$ between the electrodes 151 to 154 vary in the second direction.

As shown in FIG. 2, the optical deflection element 11 is connected to the power supply 12. Specifically, the ends of the electrodes 15 are connected to the power supply 12. The wiring between the ends of the electrodes 15 and the power supply 12 is provided such that a voltage can independently be applied to the electrodes 15. The wiring is also provided such that a voltage can selectively be applied to the electrodes 15 at an interval $\Lambda$ between at least two electrodes.

Note that any one of the second intervals $L_2$ may be equal to the first interval $L_1$.

If the amplitude or intensity, phase and cycle of the SAW from the electrodes 15 arranged in the first direction can be made equal to those of the foregoing configuration by controlling, for example, the timing of application of a voltage and the magnitude of the applied voltage, an independent power supply system may be used between the electrodes 151 to 154.

The electrodes 15 arranged in the first direction and the electrodes 15 arranged in the second direction may be independent power supply systems or may be different in number.

The electrodes 15 arranged in the second direction need not be provided or may be arranged symmetrically with regard to the incidence plane $F_{in}$ on the surface of the optical deflection element 11.

The electrodes 15 arranged in the first direction may be arranged on one of the incidence planes $F_{in}$ on the surface of the optical deflection element 11. In this case, a dummy pattern 16 has only to be formed between the electrodes 15 and the incidence plane $F_{in}$.

As shown in FIG. 3, a dummy pattern 16 is formed on the surface of the substrate 13. The dummy pattern 16 is formed inside and/or near the incidence plane $F_{in}$. The dummy pattern 16 is formed in the first direction. The dummy patterns 16 includes a plurality of lines. The interval between the lines of the dummy patterns 16 is equal to, for example, the first interval $L_1$. The dummy pattern 16 is formed of, for example, linear members similar to the electrodes 15. Unlike the electrodes 15, however, the dummy pattern 16 is not provided with wiring for applying a voltage.

The interval between the lines of the dummy pattern 16 may be larger or smaller than the first interval $L_1$ as long as the lines are parallel to the electrodes 15 arranged in the first direction.

As the dummy pattern 16, for example, a groove may be provided in the surface of the substrate 13 or some of the electrodes 15 may be used. If the electrodes 15 are used as the dummy pattern 16, no voltage is applied to the electrodes 15; thus, the electrodes 15 need not be provided with wiring for applying a voltage. If the electrodes 15 are provided with wiring, they are not selected as electrodes to which a voltage is applied.

The dummy pattern 16 has only to be formed linearly in the first direction. For example, it may be formed like broken lines and may vary column to column.

The power supply 12 is connected to the electrodes 15 of the optical deflection element 11. The power supply device 12 is so configured that it can apply a predetermined voltage to an optional one of the electrodes 15. The predetermined voltage is a voltage (hereinafter referred to as an applied voltage) capable of generating SAWs from electrodes to which a voltage is applied (hereinafter referred to as application electrodes) on the surface of the substrate 13. The predetermined voltage is set in accordance with, for example, interval $\Lambda$ between the application electrodes. The application electrodes is set in accordance with the wavelength $\lambda$ of laser light incident upon the optical deflection element 11 and the angle (hereinafter referred to as a deflection angle $\theta$) at which desired laser light is deflected in the optical deflection element 11.

The optical system 10 may include an incident optical element for causing the laser light incident on the optical deflector 4 to enters the optical deflection element 11, an emission optical element for emitting the laser light exited from (transmitted through) the optical deflection element 11 to the outside of the optical deflector 4, and the like. As these optical elements, for example, lenses, optical fibers, laser waveguides and the like are used.

Figure 4:
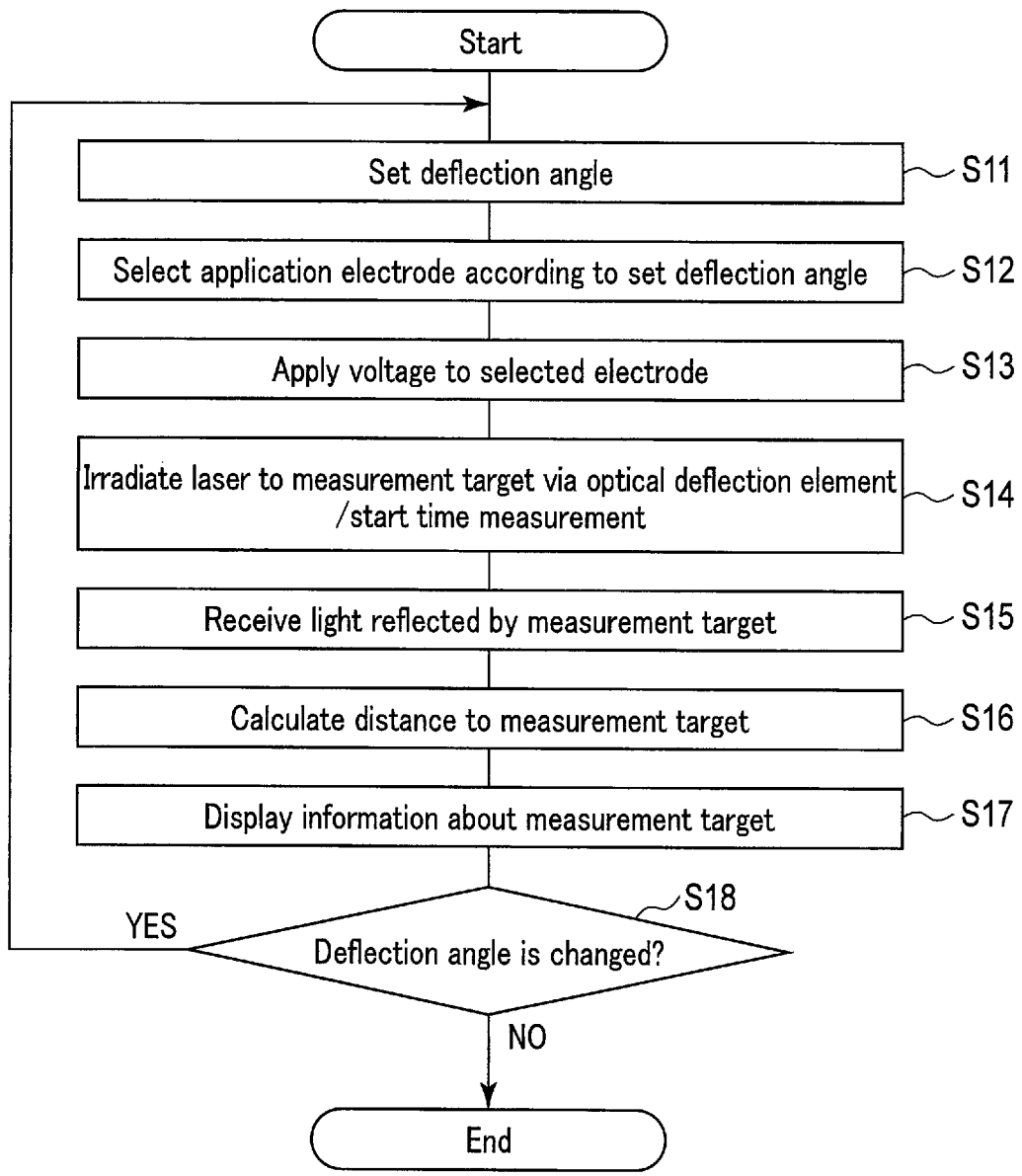
FIG. 4 is a flowchart showing a flow of an optical measurement performed using the optical measurement system of FIG. 1.

An example of the operation of the optical deflector 4 according to the present embodiment will be described in more detail with reference to the drawings. FIG. 4 is a flowchart illustrating a flow of optical measurement performed using the optical measurement system 1 shown in FIG. 1.

The flow of the optical measurement includes a flow of changing a deflection angle by operating the power supply 12 by a user (steps S11 to S13 and step S18) and a flow of a measurement process performed by the processing circuitry 8 (steps S14 to S17).

In step S11, the user sets a deflection angle $\theta$ in accordance with the direction of the measurement target and the range thereof.

In step S12, the user selects an application electrode based upon the wavelength $\lambda$ of laser light $B_{in}$ generated by the laser source 5 and the deflection angle $\theta$ set in step S11. The selection of an application electrode will now be described in detail with reference to the drawing. FIG. 5 is a diagram explaining the deflection of light by the optical deflection element of FIG. 3.

For example, an application electrode is selected from among the electrodes 15 arranged in the first direction so that the interval between adjacent two electrodes corresponds to the interval $\Lambda$. Note that the number of application electrodes is not limited. Assume here that a predetermined voltage is applied to the selected application electrode. Then, an SAW having a wavelength $\Lambda$ is generated in the substrate 13 as shown in FIG. 5. The SAW generated in the substrate 13 propagates from one of the two adjacent application electrodes to the other. Then, periodic refractive index distributions are generated in the substrate 13 at regular intervals of the wavelength $\Lambda$ as shown in FIG. 5.

The speed of the SAW is sufficiently slower than that of light. Thus, it can be considered that the SAW stops during the period from when the light enters the optical deflection element 11 until the light exits. In other words, it can be considered that the refractive index distributions generated in the substrate 13 by the SAW does not change while the light is transmitted through the substrate 13.

Therefore, it can be said that the substrate 13 on which the SAW is generated functions as a diffraction grating for the laser light. That is, as shown in FIG. 5, the laser light $B_{in}$ incident on the incidence surface $F_{in}$ of the optical deflection element 11 is diffracted, with the result that the laser light $B_{in}$ is deflected by the optical deflector 4. The deflected laser light $B_{def}$ is transmitted (emitted) from the emission plane $F_{em}$. In the example shown in FIG. 5, 0th-order diffracted light $B_{def0}$, +1st-order diffracted light $B_{def+1}$, −1st-order diffracted light $B_{def-1}$, and +2nd-order diffracted light $B_{def+2}$ are shown as diffracted light $B_{def}$. The ±1st-order diffracted light (diffracted light $B_{def+1}$ and diffracted light $B_{def-1}$) is laser light deflected by the deflection angle $\theta_1$, and the +2nd-order diffracted light $B_{def+2}$ is laser light deflected by the deflection angle $\theta_2$.

As is seen from the above, the deflection angle $\theta$ of the laser light emitted from the optical deflection element 11 can be expressed by the following equation. In this equation, the wavelength of the laser light incident upon the optical deflection element 11 is $\lambda$. It is assumed that the laser light is incident on the incidence plane $F_{in}$ perpendicularly.

$$\sin\theta = m\frac{\lambda}{\Lambda}. \qquad (1)$$

In equation (1), m is the diffraction order and is an integer. When m is equal to 0, the deflection angle $\theta$ represents the deflection angle $\theta_0$ of the 0th-order diffracted light $B_{def0}$. According to the equation (1), since $\theta$ is equal to 0 when m is equal to 0, the 0th-order diffracted light $B_{def0}$ is not deflected but transmitted. In addition, when m is equal to ±1, the equation (1) represents the deflection angle $\theta_1$ of the ±1st-order diffracted light (diffracted light $B_{def+1}$ and diffracted light $B_{def-1}$). That is, the deflection angle $\theta_1$ of the ±1st-order diffracted light can be expressed by the following equation using the equation (1).

$$\sin\theta_1 = \pm\frac{\lambda}{\Lambda}. \qquad (2)$$

When the distance $\Lambda$ is larger than the wavelength $\lambda$ between adjacent two application electrodes arranged in the first direction, the deflection angle $\theta_1$ has a real value and can be expressed by the following equation.

$$\theta_1 = \pm\sin^{-1}\left(\frac{\lambda}{\Lambda}\right). \qquad (3)$$

That is, when $\Lambda$ is equal to or larger than $\lambda$, the deflection angle $\theta_1$ of the ±1st-order diffracted light can be expressed by the equation (3). On the other hand, when the distance $\Lambda$ is less than the wavelength $\lambda$ between adjacent two application electrodes arranged in the first direction, the deflection angle $\theta_1$ of the ±1st-order diffracted light does not have a real value. That is, when $\Lambda$ is smaller than $\lambda$, the laser light is not deflected or the ±1st-order diffracted light does not occur. In other words, the range of the deflection angle $\theta$ by the optical deflector 4 is a range in which the deflection angle $\theta$ has a real value, and is defined by the wavelength $\lambda$ of the laser light and the range of the interval $\Lambda$ between the application electrodes that can be achieved by the electrodes 15.

As described above, the interval $\Lambda$ satisfying the equation (3) has only to be set when a user wishes to deflect the laser light with the wavelength $\lambda$ by the deflection angle $\theta$. That is, the user has only to select at least two application electrodes from the electrodes 15 such that the selected electrodes are arranged at regular intervals $\Lambda$. In other words, as application electrodes, at least two electrodes have only to be selected according to the deflection angle $\theta$ from the electrodes 15 such that the selected electrodes are arranged at regular intervals $\Lambda$. Even though the electrodes 15 are arranged on the substrate 13 at irregular intervals in the first direction, at least two electrodes have only to be selected from among the electrodes 15 such that the selected electrodes are arranged at regular intervals $\Lambda$ for each deflection angle $\theta$.

When the interval $\Lambda$ is set, the refraction of the laser light on the incidence plane $F_{in}$ and emission plane $F_{em}$ may be further considered.

In step S13, the user applies an application voltage to the selected application electrode using the power supply 12. At this time, periodic refractive index distributions are generated in the substrate 13 at regular intervals, as described above with reference to FIG. 5. Thus, the substrate 13 acts as a diffraction grating for the laser light.

In step S14, the processing circuitry 8 that implements the measurement function 8a starts to irradiate laser light to a measurement target in response to, for example, a user operation. The processing circuitry 8 also starts to measure time as the laser light is generated.

In step S15, the photosensor 6 receives light reflected from the measurement target. Then, the intensity of the light-receiving signal supplied from the photosensor 6 to the processing circuitry 8 varies. The processing circuitry 8 terminates the time measurement in accordance with the time-series change of the light-receiving signal.

In step S16, the processing circuitry 8 calculates the distance to the measurement target (information about the measurement target) based on the elapsed time and the speed of light obtained by the time measurement. The processing circuitry 8 may calculate the density of measurement targets and the like (information about the measurement target) in accordance with the intensity of the light-receiving signal.

In step S17, the processing circuitry 8 generates image data for displaying the calculated information about the measurement target. The generated image data is output to the memory 7, the display 9 and the like.

In step S18, the user determines whether to change the deflection angle $\theta$. For example, when the user performs further optical measurement for another deflection angle $\theta$, the user determines to change the deflection angle $\theta$. When the user determines to change the deflection angle $\theta$, the process returns to step S11, and the flow of steps S11 to S18 is repeated. On the other hand, when the user does not determine to change the deflection angle $\theta$, the optical measurement is terminated.

The optical deflector 4 according to the present embodiment described above brings about the following advantages.

In the optical deflector 4, the electrodes 15 are at least three electrodes arranged on the surface of the substrate 13 at first intervals $L_1$ in the first direction. The first intervals $L_1$ are fixed (regular intervals). When a voltage is applied to the electrodes 15, the electrodes 15 can generate an SAW having a first wavelength on the substrate 13. The interval $\Lambda$ between the electrodes to which the voltage is applied is a first interval. The first wavelength corresponds to the first intervals $L_1$.

In the optical deflector 4, the electrodes 15 are at least two electrodes and are arranged at intervals $\Lambda$ such that a voltage can selectively be applied to the electrodes. The electrodes 15 are arranged at intervals different from the first intervals $L_1$, and a voltage is selectively applied to the electrodes, with the result that they can generate an SAW having a second wavelength different from the first wavelength on the substrate 13. The second wavelength corresponds to the intervals $\Lambda$ different from the first intervals $L_1$.

At least two electrodes have only to be selected as application electrodes from the electrodes 15 such that they are arranged at regular intervals $\Lambda$. Therefore, the electrodes 15 may be arranged at regular intervals or at irregular intervals in the first direction on the substrate 13, as described above. In other words, as application electrodes, at least two electrodes arranged at first intervals $L_1$ in the first direction have only to be selected and at least two electrodes arranged at intervals different from the first intervals $L_1$ in the first direction have only to be selected. At least two electrodes arranged at first intervals $L_1$ in the first direction and at least two electrodes arranged at intervals different from the first intervals $L_1$ in the first direction are achieved by at least three electrodes when at least one of these four electrodes is shared.

Therefore, the technique according to the present embodiment makes it possible to cause the substrate 13 to function as a diffraction grating with intervals $\Lambda$ and deflect the incident laser light.

In the optical deflector 4 according to the present embodiment, the electrodes 15 arranged in the first direction are symmetrical with regard to the incidence plane $F_{in}$. In other words, the electrodes 15 are arranged mirror-symmetrically with regard to a symmetry line such that they are located in the first direction at two different positions on the same plane (surface) of the substrate 13. As described above, according to the technique of the present embodiment, the wavelength of the SAW depends upon the pitches between the electrodes 15. The symmetrically arranged electrodes 15 can thus synchronize the two SAWs. In other words, when two SAWs generated at both ends of the incidence plane $F_{in}$ moves to the incidence plane $F_{in}$, they overlap each other and become a standing wave. The standing wave is twice the intensity of each of the two SAWs generated at both ends of the incidence plane $F_{in}$. In other words, the refractive index change made in the substrate 13 by the standing wave is twice the refractive index change made in the substrate 13 by each of the two SAWs. That is, the technique according to the present embodiment brings about the advantages of increasing the diffraction efficiency and deflecting more light.

In the optical deflector 4 according to the present embodiment, the deflection angle θ is determined by the wavelength λ of the laser light and the interval $\Lambda$ between adjacent two application electrodes, as described using the equation (3). The deflection angle θ can thus be changed within a predetermined range by selecting an electrode to which a voltage is applied to change the interval $\Lambda$. That is, the technique of the present embodiment brings about the advantage that laser light having a desired deflection angle θ can be emitted. The technique also brings about the advantage that the optical deflector 4 is resistant to vibration because laser light can be deflected not mechanically but electrically.

In the optical deflector 4 according to the present embodiment, the dummy pattern 16 is formed in the first direction (Y direction). The interval between lines of the dummy pattern 16 is equal to, for example, the first interval $L_1$. With this configuration, a surface state similar to the state of a region where the electrodes 15 are arranged can be achieved for the SAW moving on the surface of the substrate 13. That is, the technique of the present embodiment brings about the advantage that when the SAW propagates to the incidence plane $F_{in}$ from the region of the electrodes 15 arranged in the first direction, the change (turbulence) of the SAW due to the presence or absence of the electrodes can be reduced.

In the optical deflector 4 according to the present embodiment, unlike in the first direction, in the second direction (X direction), continuous second intervals $L_2$ are different from each other. When a voltage is applied to the electrodes at equal intervals, an SAW is generated. On the other hand, when a voltage is applied to the electrodes at unequal intervals, no SAW is generated. Thus, according to the technique of this embodiment, when a voltage is applied to the selected application electrode to generate an SAW propagating in the Y direction (first direction), an SAW propagating in the X direction (second direction) can be prevented from being generated. The SAW propagating in the X direction interferes with the SAW propagating in the Y direction and disturbs the SAW propagating in the Y direction. If the SAW propagating in the Y direction is disturbed, the periodic refractive index distribution formed by the SAW propagating in the Y direction is also disturbed. In other words, the technique according to the present embodiment brings about the advantage capable of suppressing a reduction in diffraction efficiency caused by the disturbance of the SAW propagating in the Y direction.

In the optical deflector 4 according to the present embodiment, the electrodes 15 may be provided on the surface (back surface) on which the emission plane $F_{em}$ of the substrate 13 is provided as well as the surface (front surface) on which the incidence plane $F_{in}$ of the substrate 13 is provided. This configuration brings about the same advantages as described above.

In the optical deflector 4 according to the present embodiment, the electrodes 15 may also be provided on the surface (back surface) on which the emission plane $F_{em}$ of the substrate 13 is provided as well as the surface (front surface) on which the incidence plane $F_{in}$ of the substrate 13 is provided. This configuration brings about the advantages of improving the diffracting efficiency further.

Note that the optical deflector 4 and the laser source 5 according to the present embodiment can be configured as a single optical deflection laser device 3. With this configuration, the laser light can be applied to a target in an optional direction and at an optional angle. This technique is applicable not only to LiDAR but also to illumination and projection of images.

The present embodiment has been described based on the case where the laser light is incident from the direction normal to the substrate 13. However, the laser light may enters the substrate 13 at any angle of incidence with respect to the substrate 13.

SECOND EMBODIMENT

An optical deflector 4 according to a second embodiment will be described in detail below with reference to the drawing. In the following descriptions, reference will be made mainly to how the second embodiment differs from the first embodiment. The same symbols will be used to denote structural elements similar or corresponding to those of the first embodiment, and a description of the structural elements will be omitted.

As in the first embodiment, Among the surfaces of the substrate 13 parallel to the X-Y plane, the +Z-side surface and the −Z-side surface will be referred to as a front surface and a back surface, respectively.

Figure 6:
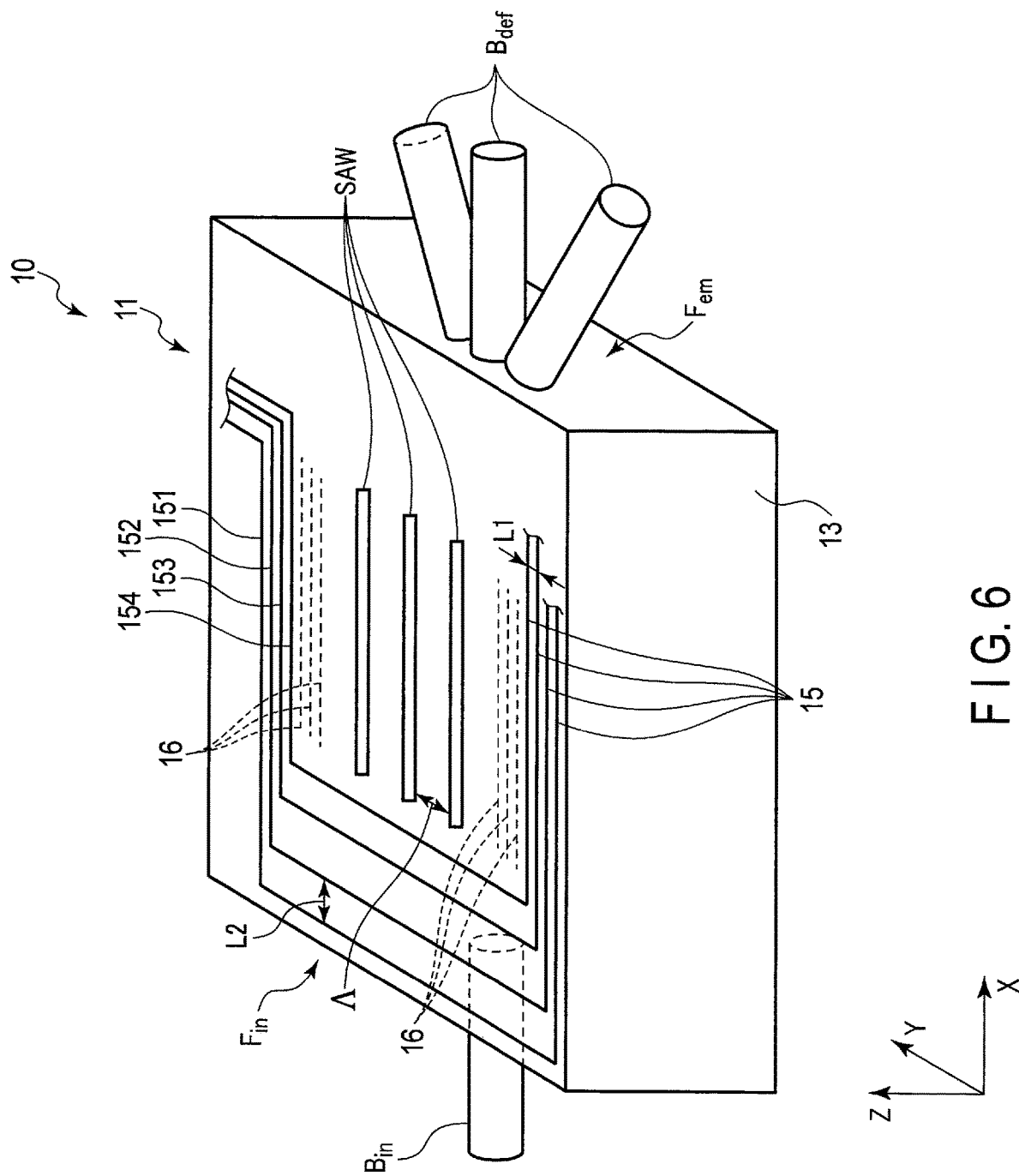
FIG. 6 is a perspective view showing an example of the configuration of an optical deflection element according to a second embodiment.

FIG. 6 is a perspective view showing another example of the configuration of the optical deflection element 11 of FIG.

3. As shown in FIG. 6, in the optical deflection element 11 according to the second embodiment, the incidence plane $F_{in}$ and the emission plane $F_{em}$ are provided on the −X-side surface (first side) and the +X-side surface (second side), respectively, which are included in the surfaces parallel to the Y-Z plane of the substrate 13. The incidence plane $F_{in}$ is, for example, the center of the −X-side plane and an area close thereto in the substrate 13. The range of the incidence plane $F_{in}$ in the Y direction is, for example, equal to the range between the electrodes 15 arranged in the first direction on the +Y-side surface and the electrodes 15 arranged in the first direction on the −Y-side surface. The emission plane $F_{em}$ is part or all of the surface (+X-side surface) opposed to the surface on which the incidence plane $F_{in}$ is provided.

The thickness of the substrate 13 according to the second embodiment is, for example, substantially the same as the wavelength of an SAW, but may be larger or smaller. However, when the thickness of the substrate 13 is larger than the wavelength of the SAW, the range of each of the incidence plane $F_{in}$ and the emission plane $F_{em}$ is, for example, approximately equal to the wavelength of the SAW from the surface on which the electrodes 15 are provided, which is included in the −X-side and +X-side surfaces of the substrate 13.

As shown in FIG. 6, the electrodes 15 and the dummy pattern 16 according to the second embodiment are the same as those in the first embodiment.

As described above, the optical deflector 4 according to the second embodiment deflects laser light $B_{in}$ incident from the −X-side surface of the substrate 13. The deflected laser light $B_{def}$ is transmitted (emitted) from the +X-side surface of the substrate 13. Assume that the laser light $B_{in}$ is parallel to the normal direction of the −X-side surface of the optical deflection element 11.

The above configuration makes it possible to deflect laser light propagating in the substrate 13. That is, the substrate 13 according to the second embodiment further functions as a laser waveguide in addition to the diffraction grating. In other words, the technique of the second embodiment brings about the advantage in which the laser waveguide and the optical deflection element can be integrated, in addition to the advantages described above. Since, furthermore, the 0th-order diffracted light $B_{def0}$, which is not deflected, is gradually attenuated as it propagates in the substrate 13, the technique of the second embodiment brings about the effect of increasing the ratio of the deflected laser light among laser light to be emitted, in addition to the advantage described above.

THIRD EMBODIMENT

An optical deflector 4 according to a third embodiment will be described in detail below with reference to the drawing. In the following descriptions, reference will be made mainly to how the third embodiment differs from the first embodiment. The same symbols will be used to denote structural elements similar or corresponding to those of the first embodiment, and a description of the structural elements will be omitted.

Figure 8:
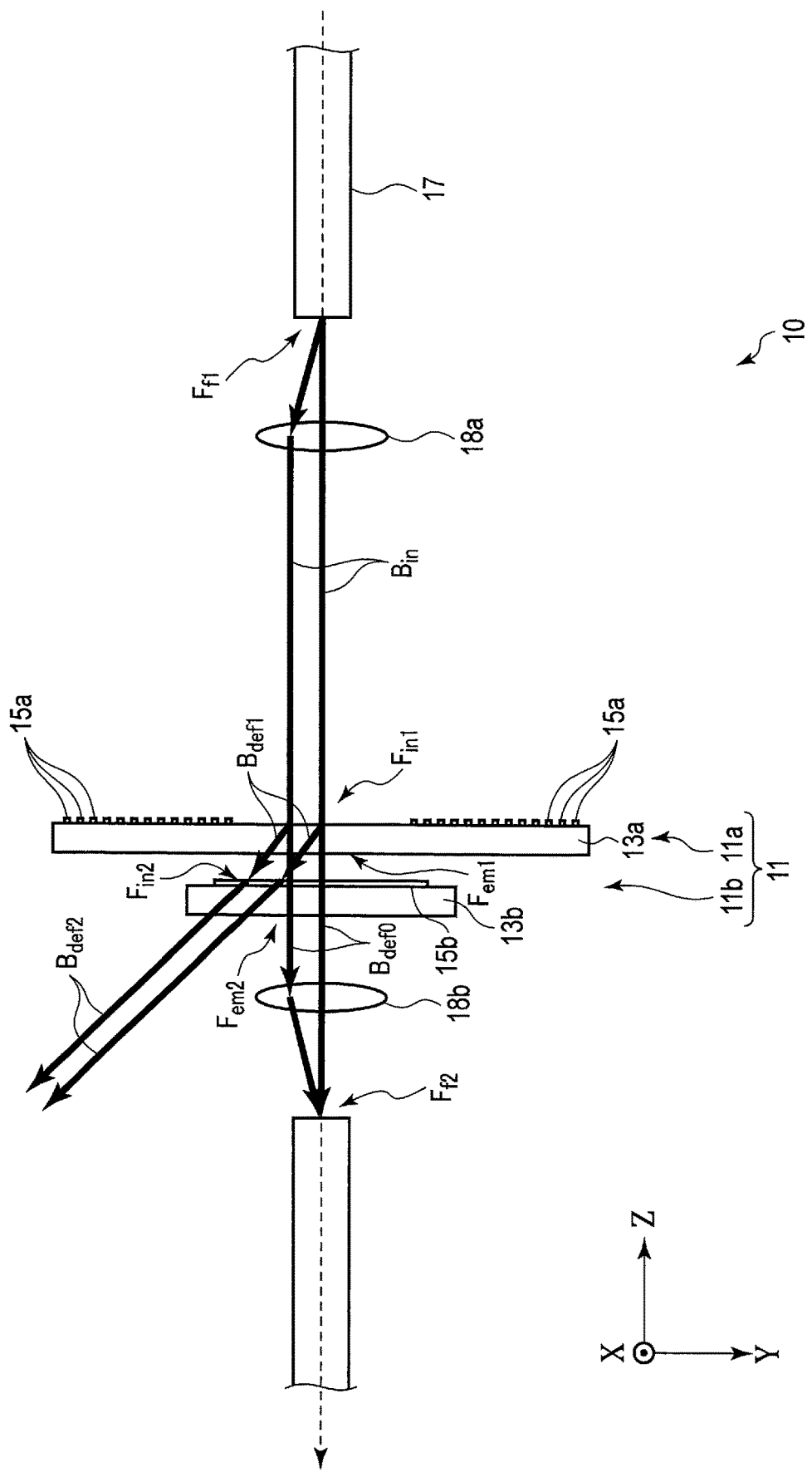
FIG. 8 is a side view showing a Y-Z section of the optical system of FIG. 7.

FIG. 7 is a perspective view showing an example of the configuration of an optical system 10 according to the third embodiment. FIG. 8 is a side view showing a Y-Z section of the optical system 10 of FIG. 7. As shown in FIGS. 7 and 8, the optical system 10 includes a first optical deflection element 11a, a second optical deflection element 11b, an optical fiber 17, a first lens 18a and a second lens 18b.

Each of the first and second optical deflection elements 11a and 11b is similar to the optical deflection element 11 according to the first embodiment. The first and second optical deflection elements 11a and 11b are rotationally symmetric with regard to the Z axis.

A plurality of first electrodes 15a are arranged on the first substrate 13a of the first optical deflection element 11a. The first electrodes 15a are arranged at regular intervals in the Y direction (first direction). The first electrodes 15a arranged in the first direction are arranged on the surface of the first optical deflection element 11a symmetrically with regard to a first incidence plane $F_{in1}$. In the first optical deflection element 11a, the first electrodes 15a are not arranged in the second direction.

A plurality of second electrodes 15b are arranged on the second substrate 13b of the second optical deflection element 11b. The second electrodes 15b are arranged at regular intervals in the X direction (second direction). The second electrodes 15b arranged in the second direction are arranged on the surface of the second optical deflection element 11b symmetrically with regard to a second incidence plane $F_{in2}$. In the second optical deflection element 11b, the second electrodes 15a are not arranged in the first direction. Note that the interval between the second electrodes 15b arranged on the second substrate 13b and the interval between the first electrodes 15a arranged on the first substrate 13a may be the same or different.

The optical fiber 17 can recursively use laser light, which is not deflected, among the laser light emitted from a second emission plane $F_{em2}$. The optical fiber 17 includes a first fiber end $F_{f1}$ and a second fiber end $F_{f2}$. The optical fiber 17 is disposed like a loop such that the first and second fiber ends $F_{f1}$ and $F_{f2}$ are opposed to each other. More specifically, the first fiber end $F_{f1}$ is disposed opposite to the first incidence plane $F_{in1}$ of the first optical deflection element 11a. The second fiber end $F_{f2}$ is disposed opposite to the second emission plane $F_{em2}$ of the second optical deflection element 11b.

Instead of the optical fiber 17, an optical lens, a mirror, a laser waveguide or the like can be used.

The first lens 18a is disposed between the first fiber end $F_{f1}$ and the first incidence plane $F_{in1}$. The incidence plane and the emission plane of the first lens 18a are opposed to the first fiber end $F_{f1}$ and the first incidence plane $F_{in1}$, respectively. The first lens 18a is configured and/or disposed to convert the divergent light emitted from the first fiber end $F_{f1}$ into light parallel to the optical axis of the optical system 10.

The second lens 18b is disposed between the second emission plane $F_{em2}$ and the second fiber end $F_{f2}$. The incidence plane and the emission plane of the second lens 18b are opposed to the second emission plane $F_{em2}$ and the second fiber end $F_{f2}$, respectively. The second lens 18b is configured and/or disposed such that laser light $B_{def}$, which is emitted (transmitted) from the second emission plane $F_{em2}$ to the incidence plane of the second lens 18b, converges to the second fiber end $F_{f2}$. The second lens 18b is, for example, a cylindrical lens.

Note that each of the first and second lenses 18a and 18b may be one lens (single lens) or a lens formed by combining two or more single-lenses (compound lens). The compound lens may be of a bonded type or a separate type.

The optical fiber 17, first lens 18a and second lens 18b are formed of, for example, an optical glass, but they are not limited to the optical glass. They may be formed of, for example, optical plastic such as polymethyl methacrylate (PMMA) and polycarbonate (PC).

Assume that the first incidence plane $F_{in1}$ of the first optical deflection element 11a, the second incidence plane $F_{in2}$ of the second optical deflection element 11b, both ends (first and second fiber ends $F_{f1}$ and $F_{f2}$) of the optical fiber 17, and the centers of the first and second lenses 18a and 18b are on the optical axis (Z axis) of the optical system 10.

Figure 9:
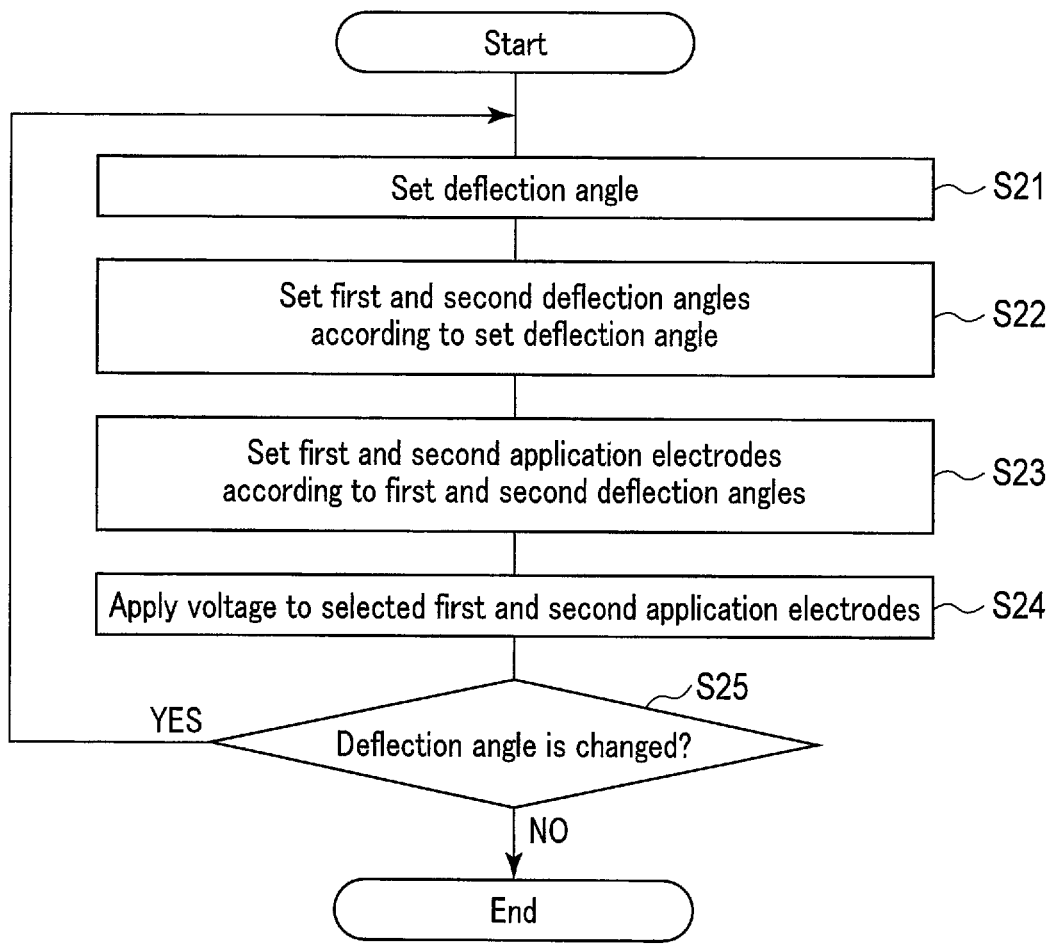
FIG. 9 is a flowchart showing a flow of a change in deflection angle, which is made using an optical deflector of the optical system of FIGS. 7 and 8.

An example of the operation of the optical deflector 4 according to the third embodiment will be described in more detail with reference to the drawing. FIG. 9 is a flowchart showing a flow of a change in deflection angle, which is made using the optical deflector 4 of the optical system 10 of FIGS. 7 and 8.

The flow of a change in deflection angle corresponds to steps S11 to S13 of the flow of the optical measurement according to the first embodiment described with reference to FIG. 4.

In step S21, a user sets a deflection angle according to the direction and angle range of a measurement target. In step S22, the user divides the set deflection angle into the Y direction (first direction) and the X direction (second direction) to set the first deflection angle (Y direction) and the second deflection angle (X direction). The first and second deflection angles are required for the first and second substrates 13a and 13b, respectively. The flow of steps S21 and S22 corresponds to step S11 in FIG. 4.

In step S23, the user selects a first application electrode and a second application electrode in accordance with the set first deflection angle and second deflection angle, respectively. For example, as in step S12 of FIG. 4, the user has only to select at least two application electrodes arranged at interval Λ determined from the equation (3), based upon the wavelength λ and the set deflection angles.

In step S24, as in step S13 of FIG. 4, the user applies a voltage to each of the set first and second application electrodes. As described above with reference to FIG. 5, the first and second substrates 13a and 13b each operate as a diffraction grating for laser light because a periodic refractive index distribution occurs at fixed intervals in each of the first and second substrates 13a and 13b.

In step S25, as in step S18 of FIG. 4, the user determines whether or not to change the deflection angle. When the user determines that the deflection angle is to be changed, the process returns to step S21 and the flow of steps S21 to S25 is repeated. On the other hand, when the user does not determine that the deflection angle is to be changed, the change of the deflection angle is terminated.

In the optical measurement according to the third embodiment, for example, between steps S24 and S25 of the flow of a change in the deflection angle shown in FIG. 9, information about the measurement target is acquired as described below.

The light emitted from the laser source 5 enters the loop-shaped optical fiber 17 by a fiber coupler (not shown). The laser light incident on the optical fiber 17 is emitted from the first fiber end $F_{f1}$, becomes divergent light, and enters the first lens 18a. The first lens 18a converts the divergent light from the first fiber end $F_{f1}$ into parallel light.

The parallel light enters the first incidence plane $F_{in1}$ of the first substrate 13a. The first substrate 13a functions as a diffraction grating by the SAW generated in the first substrate 13a to deflect part of the incident light $B_{in}$ in the Y direction. The deflected light $B_{def1}$ is emitted (transmitted) from the first emission plane $F_{em1}$ of the first substrate 13a. The other undeflected light $B_{in}$ travels straight.

The light $B_{def1}$ deflected by the first substrate 13a further enters the second incidence plane $F_{in2}$ of the second substrate 13b. The second substrate 13b functions as a diffraction grating by the SAW generated in the second substrate 13b to deflect part of the incident light $B_{def1}$ in the X direction. The deflected light $B_{def2}$ is emitted (transmitted) from the second emission plane $F_{em2}$ of the second substrate 13b. The other undeflected light $B_{def1}$ travels straight.

There is also laser light (e.g. light $B_{def0}$) that travels straight without being deflected by either of the first and second substrates 13a and 13b. Alternatively, when no SAW is generated on the first substrate 13a or the second substrate 13b, that is, when current flows through none of the first and second electrodes 15a and 15b provided on both the substrates (a voltage is applied to none of these electrodes), the laser light also travels straight.

The laser light such as the light $B_{def0}$ that travels straight through the first and second optical deflection elements 11a and 11b, enters the second lens 18b. The laser light that has been collected by the second lens 18b enters the second fiber end $F_{f2}$ of the optical fiber 17. The laser light incident on the second fiber end $F_{f2}$ propagates through the loop-shaped optical fiber 17 and is emitted from the first fiber end $F_{f1}$ again.

The following can be obtained from the optical deflector 4 according to the third embodiment described above.

In the optical deflector 4 according to the third embodiment, the first electrodes 15a disposed in the first optical deflection element 11a are at least three electrodes arranged at regular intervals in the first direction. The second electrodes 15b disposed in the second optical deflection element 11b are at least three electrodes arranged at regular intervals in the second direction orthogonal to the first direction. Thus, in the optical deflector 4, part of the light $B_{in}$ incident on the first and second optical deflection elements 11a and 11b is deflected in two directions (X and Y directions) orthogonal to each other. The technique of the third embodiment therefore brings about the advantage that laser light can be deflected in all directions, in addition to the advantages described above.

In the optical deflector 4, the loop-shaped optical fiber 17 need not be provided. The first lens 18a or the second lens 18b need not be provided, either. With this configuration, too, the same advantages as described above can be obtained. In addition, the optical deflector 4 according to the third embodiment brings about the advantage that its configuration can be simplified and downsized.

In the optical deflector 4 according to the third embodiment, the laser light that has traveled straight through the first and second optical deflection elements 11a and 11b is collected by the optical fiber 17 and then enters the first and second optical deflection elements 11a and 11b again. Therefore, the technique of the third embodiment brings about the advantage that the undeflected light can be used recursively, in addition to the advantages described above.

Note that the laser light recursively used by the optical fiber 17 is not limited to laser light that has traveled straight through the first and second optical deflection elements 11a and 11b. In the optical deflector 4 according to the third embodiment, laser light that can be collected by the second lens 18b can recursively be used even though it is deflected by the first substrate 13a and/or the second substrate 13b.

In the optical deflector 4 according to the third embodiment, the first lens 18a can increase the diameter of laser light. Accordingly, the diameter of laser light incident on the first and second substrates 13a and 13b can be increased and the intensity of laser light can be decreased. The decrease in laser intensity contributes to a decrease in laser absorption by each of the substrates 13. The laser absorption varies the refractive index distribution in each of the substrates 13. The technique of the third embodiment can reduce the variation in the refractive index distribution in each of the substrates 13 caused by the laser absorption and thus prevent a diffraction grating formed by an SAW from being disturbed by the variation in the refractive index distribution caused by the laser absorption. That is, the technique of the third embodiment brings about the advantage of suppressing a decrease in diffraction efficiency.

In the third embodiment, the optical deflector 4 is configured by combining two optical deflection elements 11 according to the first embodiment. The optical deflector 4 may be configured by combining the optical deflection element 11 according to the first embodiment and the optical deflection element 11 according to the second embodiment. The optical deflector 4 may also be configured by combining two optical deflection elements 11 according to the second embodiment. These configurations can also bring about the advantages described in each of the foregoing embodiments.

In the optical deflector 4 according to the third embodiment, the first optical deflection element 11a and the second optical deflection element 11b may be formed integrally as one component. For example, the first substrate 13a with the second electrodes 15b arranged on its back surface in the second direction orthogonal to the first direction, may be used as the first and second optical deflection elements 11a and 11b which are formed integrally as one component. That is, the first electrodes 15a may be arranged in the first direction on the front surface of one substrate 13 and the second electrodes 15b may be arranged in the second direction on the back surface of the one substrate 13. This configuration brings about the advantage that laser light can be deflected in all directions by one substrate 13.

The optical deflection elements 11 according to the third embodiment can be combined with another deflection element or an optical deflector. Other deflection elements or optical deflectors may be of a movable mirror type such as a galvanomirror, a micro electro-mechanical systems (MEMS) type, an acousto-optics (AO) type, and an electro-optics (EO) type.

FOURTH EMBODIMENT

An optical deflector 4 according to a fourth embodiment will be described in detail below with reference to the drawing. In the following descriptions, reference will be made mainly to how the fourth embodiment differs from the first embodiment. The same symbols will be used to denote structural elements similar or corresponding to those of the first embodiment, and a description of the structural elements will be omitted.

Figure 10:
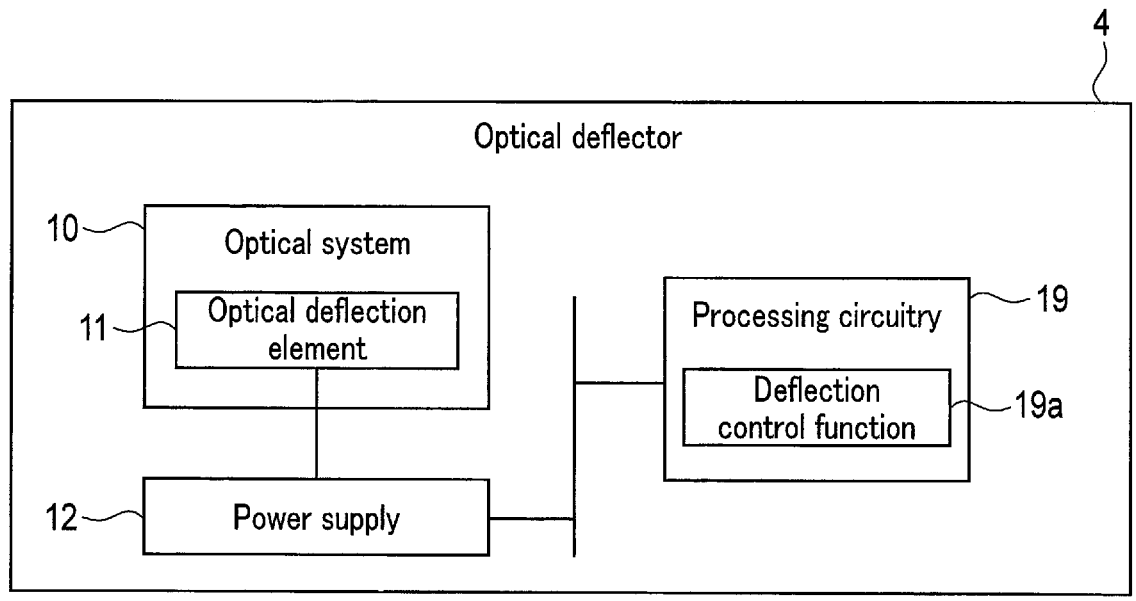
FIG. 10 is a block diagram showing an example of the configuration of an optical deflector according to a fourth embodiment.

FIG. 10 is a block diagram showing an example of the configuration of the optical deflector 4 according to the fourth embodiment. As shown in FIG. 10, the optical deflector 4 further includes processing circuitry 19, and the processing circuitry 19 is communicably connected to a power supply 12 via a bus, a network or the like. In the optical measurement system 1 according to the third embodiment, the optical deflector 4, laser source 5, photosensor 6, memory 7, processing circuitry 8 and display 9 are communicably connected to each other via a bus, a network, or the like.

The processing circuitry 19 is similar to, for example, the processing circuitry 8 and is an integrated circuit such as a CPU and an ASIC. As the processing circuitry 19, a general-purpose computer may be used. The processing circuitry 19 may be provided as a dedicated circuit without being limited to a circuit to implement various functions by various programs developed in the memory. The programs may be stored in a storage area in the integrated circuit. The processing circuitry 19 performs a deflection control function 19a.

In the deflection control function 19a, the processing circuitry 19 controls the operation of the power supply 12. The processing circuitry 19 selects an application electrode based on the wavelength λ and the deflection angle θ. The processing circuitry 19 applies a predetermined voltage to the selected application electrode. In other words, the processing circuitry 19 controls the operation of the power supply 12 to control the deflection angle of laser light. The processing circuitry 19 switches between at least two electrode intervals Λ to displace the deflection of the laser light. The processing circuitry 19 that implements the deflection control function 19a is an example of a deflection control unit recited in the claims.

The processing circuitry 19 may be external to the optical deflector 4 or the optical measurement apparatus 2. The processing circuitry 8 and the processing circuitry 19 may be formed integrally as one component. That is, the deflection angle may be controlled inside or outside the optical deflector 4 or the optical measurement apparatus 2.

Note that the optical deflector 4 may further include a storage medium (not shown) which is similar to the memory 7.

An example of the operation of the optical deflector 4 according to the fourth embodiment will be described in comparison with the flow of a change in the deflection angle shown in FIG. 9. The same applies to the flow of a change in the deflection angle shown in FIG. 4 though its description is omitted.

The flow of optical measurement includes a flow of a change in the deflection angle executed by the processing circuitry 19 of the optical deflector 4, namely, a deflection control process and a measurement process executed by the processing circuitry 8.

In step S21, the processing circuit 19 that implements the deflection control function 19a sets a deflection angle in response to, for example, a user input. In step S22, the processing circuitry 19 sets a first deflection angle (Y direction) and a second deflection angle (X direction) from the set deflection angle.

In step S23, the processing circuitry 19 selects a first application electrode and a second application electrode in accordance with the set first deflection angle and second deflection angle, respectively.

Note that various parameters required for determining the equation (3), wavelength λ, and interval Λ such as the first interval $L_1$ and the second interval $L_2$ have only to be set in advance and stored in, for example, the memory 7 or the storage area of the processing circuitry 19. In addition, a deflection angle, a range for the deflection, and the number of divisions thereof may be set in advance and stored in the memory 7 or the storage area of the processing circuitry 19.

In step S24, the processing circuitry 19 controls the power supply 12 to apply an application voltage to each of the set applied electrodes. Each of the substrates 13 thus operates as a diffraction grating. After the application of a voltage is started, the processing circuitry 19 generates a control signal to provide an instruction about the start of a measurement processing and outputs it to the processing circuitry 8. In addition, when the processing circuitry 19 receives from the processing circuitry 8 a control signal indicating that a light-receiving signal has been received, it stops the application of the voltage.

In step S25, the processing circuitry 19 determines whether or not to change the deflection angle. In this case, the processing circuity 19 determines that the deflection angle is to be changed when the measurement of a preset deflection range has not been completed, when the user input for providing an instruction about the end of deflection control has not been received, or the like. When the processing circuity 19 determines that the deflection angle is to be changed, the process returns to step S21, and the process of steps S21 to S25 is repeated. On the other hand, when the processing circuity 19 does not determine that the deflection angle is to be changed, the deflection control process is terminated.

The application of a voltage need not be stopped every time it passes step S24. For example, it may be stopped when the processing circuity 19 does not determine in step S25 that the deflection angle is to be changed. That is, the application of a voltage need not be stopped during the repetition of the process of steps S21 to S25.

As described above, the optical deflector 4 according to the fourth embodiment can control a deflection angle within an optional range. Furthermore, the optical measurement apparatus 2 can acquire information on a measurement target during the control of a deflection angle within an optional range.

APPLICATION EXAMPLE

The optical measurement system 1 or the optical measurement apparatus 2 according to each of the foregoing embodiments can be attached to an appropriate moving body. The technique according to each of the embodiments provides a moving body mounted with the optical measurement apparatus 2 using the optical deflection element 11 or the optical deflector 4, which is decreased in the influence of mechanical vibration and whose deflection angle displacement speed is higher than that of the mechanical type. Below is a description of an example where a flying object such as an automobile, a ship and an aircraft, which correspond to a first application example, a second application example and a third application example, respectively, is used as a moving body. The moving body is so configured that it can be stopped and moved. The front, rear, right and left sides may be defined on the moving body.

First Application Example

Figure 11:
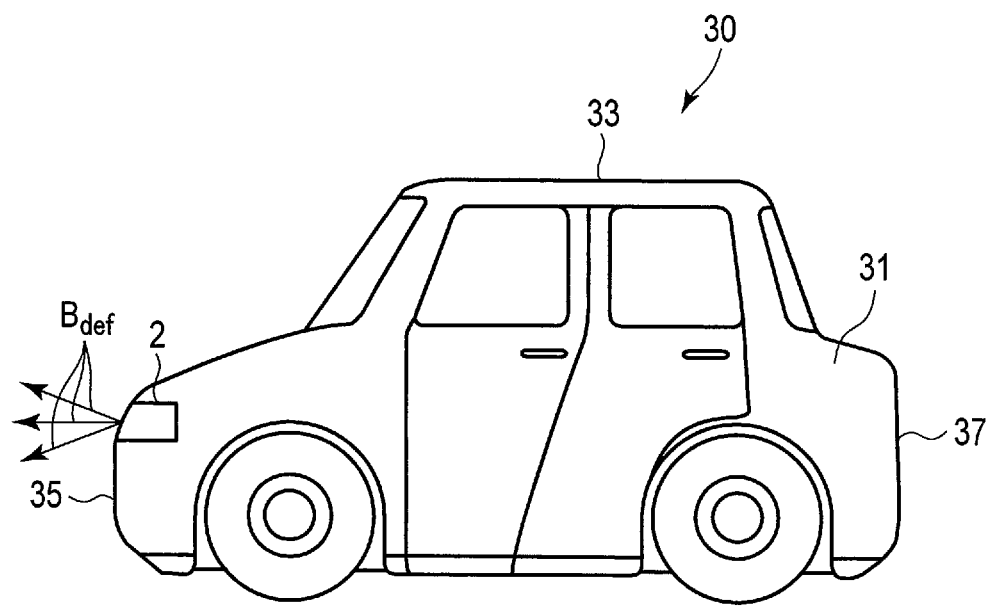
FIG. 11 is a schematic view showing an automobile as an example of a moving body to which an optical measurement apparatus according to each of the embodiments is attached.

FIG. 11 is a schematic view showing an automobile as an example of a moving body 30 to which the optical measurement apparatus 2 according to each of the embodiments is attached. As shown in FIG. 11, the moving body 30 includes a body 31 and an optical measurement apparatus 2. The optical measurement apparatus 2 is attached to the body 31 of the moving body 30 that moves on land such as an automobile.

In the example shown in FIG. 11, the optical measurement apparatus 2 is fixed to the front bumper 35 as an example. This application example makes it possible to detect the presence or absence and the position of other vehicles, pedestrians, obstacles, driving lanes, etc. in a predetermined angular range ahead of the moving body 30. Since the optical measurement apparatus 2 according to each of the embodiments includes the optical deflector 4 which decreases in the influence of mechanical vibration, it can reduce the influence of vibration generated during the running. Since, furthermore, the deflection angle displacement speed is higher than that of the mechanical optical deflector, the range of the movement speed of the moving body 30 that can be detected is large.

The optical measurement apparatus 2 is not limited to the front bumper 35 of the body 31 of the moving body 30, but may be fixed to the rear bumper 37 and the top face (top surface) of the roof 33. In addition, the optical measurement apparatus 2 may be disposed in a car (in the body 31) depending on the wavelength of laser light. In this case, the laser light exits or enters through a front glass, a rear glass, a side window and the like. A plurality of optical measurement apparatuses 2 may be attached to the body 31.

Second Application Example

Figure 12:
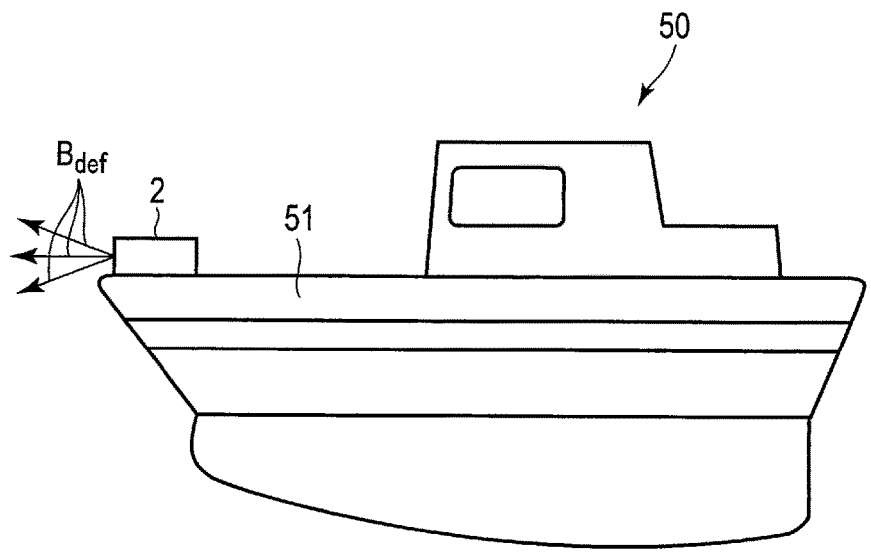
FIG. 12 is a schematic view showing a ship as an example of a moving body to which an optical measurement apparatus according to each of the embodiments is attached.

FIG. 12 is a schematic view showing a ship as an example of a moving body 50 to which the optical measurement apparatus 2 according to each of the embodiments is attached. As shown in FIG. 12, the moving body 50 includes a body 51 and an optical measurement apparatus 2. The optical measurement apparatus 2 can be attached to the body 51 of the moving body 50 that moves on the sea such as a ship. The optical measuring device 2 can be attached to the bow, stern, or any other suitable portions of the body 51 of the moving body 50. The optical measurement apparatus 2 may also be used for a submarine (moving body) capable of moving in the sea and the like, in addition to the ship moving on the sea. This application example makes it possible to detect the presence or absence and the position of other ships, obstacles and the like. A plurality of optical measurement apparatuses 2 may be attached to the body 51.

Third Application Example

Figure 13:
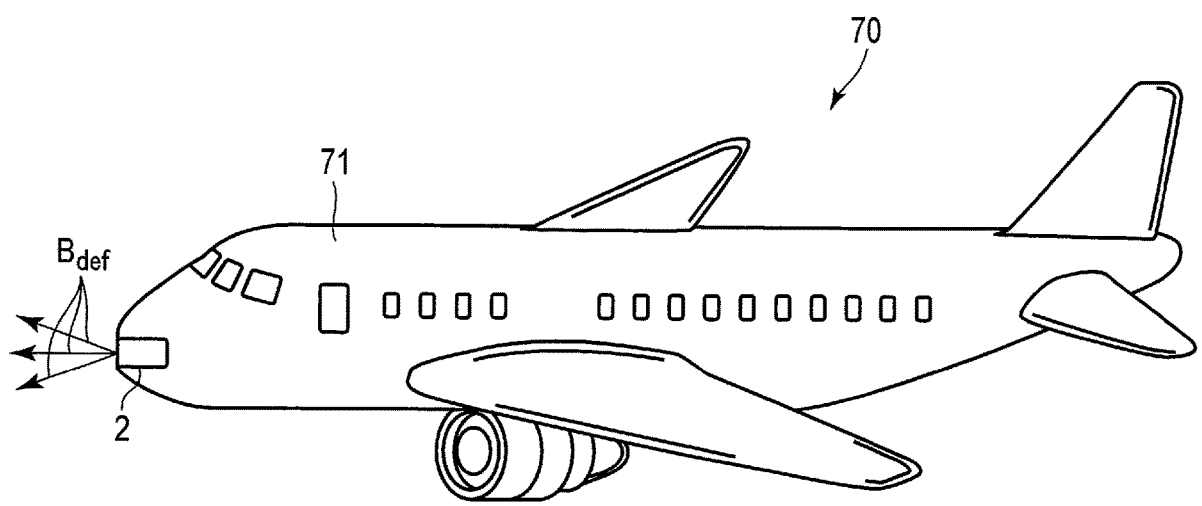
FIG. 13 is a schematic view showing an aircraft as an example of a moving body to which an optical measurement apparatus according to each of the embodiments is attached.

FIG. 13 is a schematic view showing an aircraft as an example of a moving body 70 to which the optical measurement apparatus 2 according to each of the embodiments is attached. As shown in FIG. 13, the moving body 70 includes a body 71 and an optical measurement apparatus 2. As shown in FIG. 13, the optical measurement apparatus 2 is attached to the body 71 of the moving body 70 such as an aircraft (including an unmanned aircraft such as a drone). The optical measurement apparatus 2 can be attached to, for example, the nose, cockpit, and other suitable portions of an aircraft. The moving body 70 also includes a spacecraft. This application example makes it possible to detect the presence or absence, the position, the altitude of the own aircraft, or the like of other aircrafts and obstacles. A plurality of optical measurement apparatuses 2 can be attached to the body 71.

According to the at least one of the foregoing embodiments, it is possible to provide an optical deflection element, a beam steering apparatus, and a moving body, which are decreased in the influence of mechanical vibration, and a control method of the beam steering apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

The invention claimed is:

1. An optical deflection element comprising:
a substrate that is transparent to laser light, the substrate having an incidence plane which the laser light enters and an emission plane from which the laser light, which has entered the incidence plane and transmitted through the substrate, exits; and three or more electrodes arranged on the substrate at first intervals in a first direction, the electrodes allowing a surface acoustic wave having a first wavelength to be generated in the substrate by applying a voltage thereto, wiring being provided such that a voltage is selectively applied to the electrodes at an interval between at least two electrodes, and the electrodes allowing a surface acoustic wave having a second wavelength other than the first wavelength to be generated in the substrate by applying a voltage selectively at electrode intervals other than the first intervals.

2. The optical deflection element of claim 1, wherein the first wavelength and the second wavelength are each longer than an internal wavelength of the laser light that enters the incidence plane.

3. The optical deflection element of claim 1, wherein the incidence plane is within an area including the surface acoustic wave generated in the substrate.

4. The optical deflection element of claim 1, wherein:
the three or more electrodes are arranged on a front surface of the substrate; and
the incidence plane and the emission plane are provided on the front surface of the substrate and a back surface thereof opposite to the front surface, respectively.

5. The optical deflection element of claim 1, wherein:
the three or more electrodes are arranged on a front surface of the substrate; and
the incidence plane and the emission plane are provided on a first side of the substrate orthogonal to the front surface and a second side thereof opposite to the first side, respectively.

6. The optical deflection element of claim 1, wherein the three or more electrodes are arranged mirror-symmetrically with regard to a symmetry line such that the electrodes are located in the first direction at two different positions on a same surface of the substrate.

7. The optical deflection element of claim 1, wherein the three or more electrodes are arranged at regular intervals in the first direction at two different positions on a same surface of the substrate and arranged at irregular intervals in a second direction orthogonal to the first direction.

8. The optical deflection element of claim 1, further comprising a dummy pattern provided in the first direction on the surface of the substrate on which the three or more electrodes are arranged.

9. The optical deflection element of claim 8, wherein the dummy pattern is an electrode that is not provided with wiring for applying a voltage.

10. The optical deflection element of claim 1, further comprising a loop-shaped optical fiber configured to cause laser light that is not deflected among laser light exited from the emission plane to enters the incidence plane and to recursively use the laser light that is not deflected.

11. The optical deflection element of claim 1, wherein:
the substrate includes a first substrate and a second substrate;
the first substrate has an emission plane opposed to an incidence plane of the second substrate; and
the three or more electrodes are arranged at regular intervals on the first substrate and the second substrate in the first direction and a second direction orthogonal to the first direction, respectively.

12. The optical deflection element of claim 11, wherein the first substrate and the second substrate are formed integrally as one component, and the three or more electrodes arranged at regular intervals in the first direction and the three or more electrodes arranged at regular intervals in the second direction are arranged on respective opposing surfaces of the substrate.

13. A beam steering apparatus comprising:
the optical deflection element recited in claim 1;
a laser source configured to generate the laser light; and
a deflection controller configured to apply a voltage to at least two of the three or more electrodes selectively to deflect the laser light by a surface acoustic wave generated on a substrate.

14. The beam steering apparatus of claim 13, wherein the deflection controller displaces deflection of the laser light by changing an interval between the two of the three or more electrodes.

15. The beam steering apparatus of claim 13, further comprising:
a photosensor configured to detect laser light reflected by a measurement target among the deflected laser light; and
a measurement controller configured to irradiate laser light to the measurement target from the laser source after the deflection controller applies a voltage to at least two of the three or more electrodes, and measure a position of the measurement target based on time from when the measurement target is irradiated with the laser light until the photosensor detects the reflected laser light.

16. A moving body to which the beam steering apparatus recited in claim 15 is attached, and which is so configured that the moving body is to be stopped and moved.

17. An optical deflection element comprising:
a substrate that is transparent to laser light, the substrate having an incidence plane which the laser light enters and an emission plane from which the laser light, which has entered the incidence plane and transmitted through the substrate, exits; and
three or more electrodes configured to allow a surface acoustic wave having a first wavelength to be generated in the substrate by applying a voltage to at least two electrodes arranged on the substrate at first intervals in a first direction and to allow a surface acoustic wave having a second wavelength other than the first wavelength to be generated in the substrate by applying a voltage at least two electrodes arranged on the substrate at intervals other than the first intervals in the first direction.

18. The optical deflection element of claim 17, wherein the three or more electrodes are provided with wiring such that a voltage is selectively applied to the electrodes at an interval between at least two electrodes.

* * * * *